United States Patent [19]

Johnson et al.

[11] 4,199,448
[45] Apr. 22, 1980

[54] REVERSE OSMOSIS MEMBRANE OF HIGH UREA REJECTION PROPERTIES

[75] Inventors: Catherine C. Johnson, Los Altos Hills; Theodore J. Wydeven, Sunnyvale, both of Calif.

[73] Assignee: The United States of America as represented by the Administrator of the National Aeronautics and Space Administration, Washington, D.C.

[21] Appl. No.: 694,407

[22] Filed: Jun. 9, 1976

[51] Int. Cl.² ............... B01D 13/04; B01D 13/00
[52] U.S. Cl. ............... 210/23 H; 204/171; 210/500 M; 427/41; 427/245
[58] Field of Search ............ 204/170, 171; 210/23 H, 210/321 R, 433 M, 500 M; 427/38, 39, 40, 41, 244, 245

[56] References Cited

U.S. PATENT DOCUMENTS

| | | | |
|---|---|---|---|
| 2,916,534 | 12/1959 | Schallus et al. | 204/171 X |
| 3,111,424 | 11/1963 | Le Clair | 427/38 X |
| 3,600,218 | 8/1971 | Pennebaker | 427/38 |
| 3,662,046 | 5/1972 | Woo et al. | 210/500 M X |
| 3,847,652 | 11/1974 | Fletcher et al. | 210/500 M X |
| 3,925,187 | 12/1975 | Bernard | 427/38 X |

*Primary Examiner*—Robert H. Spitzer
*Attorney, Agent, or Firm*—Darrell G. Brekke; John R. Manning; Armand McMillan

[57] ABSTRACT

Polymeric membranes suitable for use in reverse osmosis water purification because of their high urea and salt rejection properties are prepared by generating a plasma of an unsaturated hydrocarbon monomer and nitrogen gas from an electrical source and forming a polymeric membrane by depositing a polymer of said unsaturated monomer from said plasma onto a substrate, such that nitrogen from the nitrogen gas is incorporated within the polymer in a chemically combined form.

17 Claims, 1 Drawing Figure

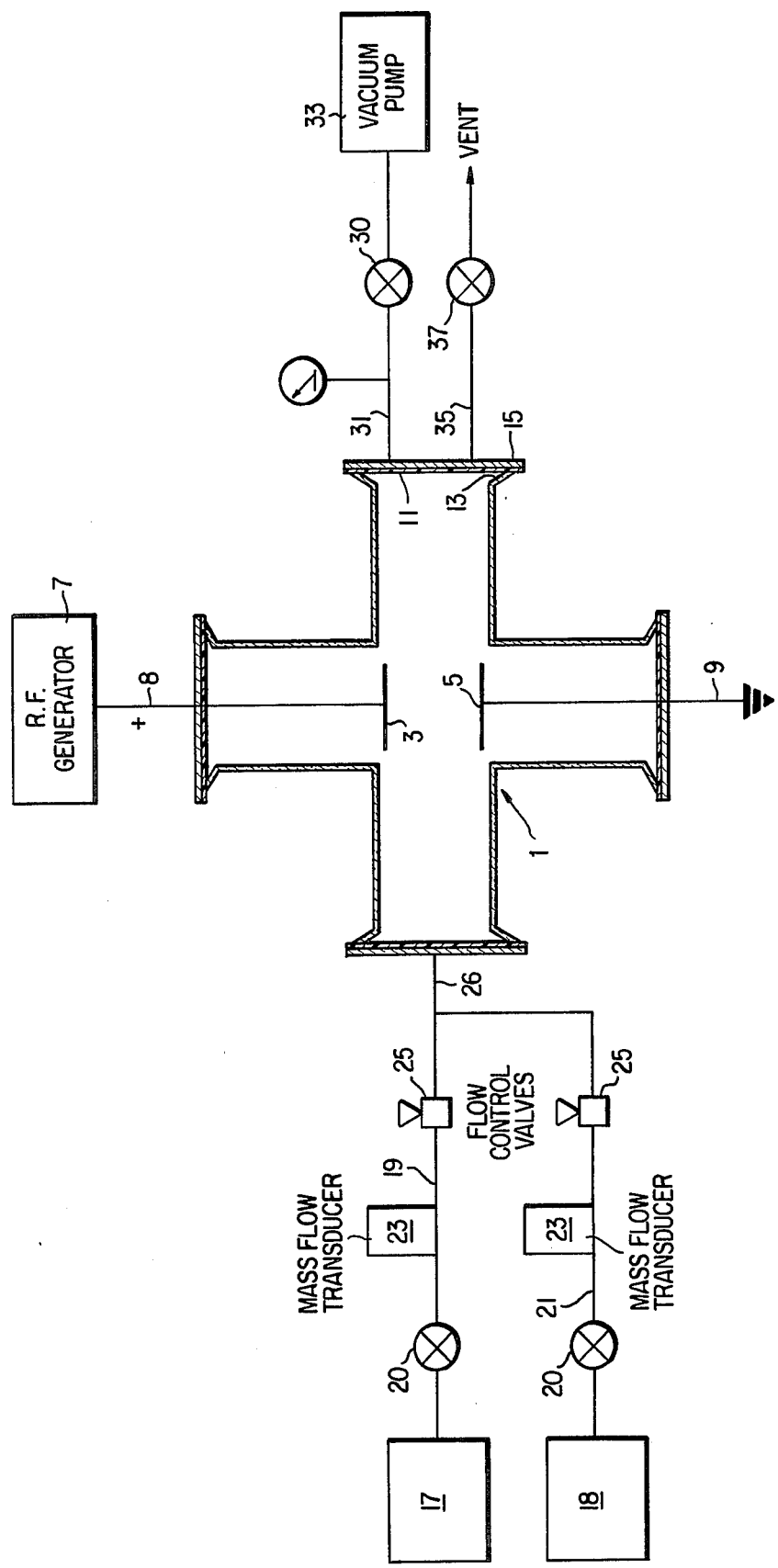

REVERSE OSMOSIS MEMBRANE OF HIGH UREA REJECTION PROPERTIES

ORIGIN OF THE INVENTION

The invention described herein was made by employees of the U.S. Government and may be manufactured and used by or for the Government for Governmental purposes without the payment of any royalties thereon or therefor.

BACKGROUND OF THE INVENTION

1. Field of the Invention

The present invention relates to polymeric membranes which are characterized by high salt rejection and high urea rejection properties. More particularly, the present invention relates to membranes prepared by the deposition of a polymeric material from an RF plasma with the simultaneous incorporation of nitrogen within the deposited membrane to form a polymeric membrane of high urea rejection properties.

2. Description of the Prior Art

Advances in semipermeable membrane technology have led to the development of many types of membranes useful in reverse osmosis techniques for the purification and clarification of aqueous solutions. Many membranes are known which perform effectively as salt rejecting membranes in the purification of brine solutions by reverse osmosis techniques. Moreover, in some special applications such as the treatment of human fluid wastes in prolonged manned space missions, it is especially imperative that all waste water be purified to a level suitable for human consumption. This means that any potentially useful membrane for such applications should not only be capable of salt rejection, but also should be capable of rejecting urea if a portable water filtered product is to be obtained.

Various techniques have been employed in the past for the manufacture of semipermeable membranes which include various casting methods such as spin casting, dip casting, doctor blade casting, and the like as well as other conventional techniques. The membranes have been formed into various shapes such as sheets, tubes, fibers and the like. In still another technique as disclosed in U.S. Pat. No. 3,847,652 an RF plasma has been used to form a polymeric film which is useful as a salt rejecting reverse osmosis membrane. In the method a liquid, ethyleneically unsaturated compound such as allyl amine is subjected to an RF field on the order of 30 to 50 watts in a vacuum of generally less than 0.3 torr. The deposition of the polymeric membrance can be accomplished in the presence of an additive gas such as nitrogen, helium, argon or the like, which generally increases the rate of polymerization. The resulting membrane, while possessing good salt rejecting properties, is not very effective in rejecting urea from aqueous waste solutions. In fact, its urea rejecting abilities are comparable to those of the commercially produced and widely used cellulose acetate membranes which exhibit less than 20% urea rejection.

In another prior art technique as shown in U.S. Pat. No. 3,775,308, a polymeric film is formed by subjecting such liquid vinyl monomers as vinylpyridine, vinylpyrrolidine or the like to electrodeless glow discharge polymerization. The polymeric membrane is deposited on a porous substrate of a material such as cellulose acetate, polysulfone, cellulose butyrate, or the like. However, the membranes of the reference also lack sufficient urea rejection properties. Furthermore, the polymerizable vinylmonomers are liquid and consequently it is difficult to control the addition of the monomer to the reaction chamber.

A need, therefore, continues to exist for a polymeric membrane which when used in the reverse osmosis purification of aqueous solutions, exhibits high urea rejecting properties.

SUMMARY OF THE INVENTION

Accordingly, one object of the present invention is to provide a polymeric membrane which is characterized by high urea and high salt rejection properties.

Another object of the present invention is to provide a method for preparing a polymeric membrane of high salt and high urea rejection properties.

Yet another object of the present invention is to provide an apparatus for the preparation of a polymeric membrane.

Briefly, these objects and other objects of the present invention as hereinafter will become more readily apparent can be attained by a polymeric membrane characterized by high urea and salt rejection properties and prepared by generating a plasma of an unsaturated hydrocarbon monomer and nitrogen gas from an electrical source and forming a polymeric membrane by depositing a polymer of said unsaturated monomer from said plasma onto a substrate, such that nitrogen from the nitrogen gas is incorporated within the polymer in a chemically combined form.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The FIGURE is a diagram of the glass cross-reactor employed in the present invention in which a polymeric material is deposited on a supporting substrate.

DETAILED DESCRIPTION OF THE PREFERRED EMBODIMENTS

The polymeric membrane of the present invention is prepared by depositing a polymeric membrane on a supporting substrate from a plasma formed by subjecting a gaseous mixture of nitrogen and an unsaturated hydrocarbon monomer to an electrical discharge. The polymeric membrane is characterized by the ability to achieve greater than 80% urea rejection in the reverse osmosis of aqueous waste solutions. In order to recover potable water from urea containing aqueous solutions it is necessary to employ a high urea rejection membrane if several stages of filtration are to be avoided.

In the preparation of the present membranes nitrogen gas and an unsaturated hydrocarbon monomer in the gaseous state are mixed in a container and subjected to an RF field. A polymer is deposited from the vaporous RF plasma onto a porous substrate. Suitable unsaturated monomers for the preparation of efficient urea rejecting membranes include alkenes such as ethylene, propylene, 1-butene, 2-butene, 1-pentene, 2-pentene, 3-pentene 1-hexene, 2-hexene and the like; alkynes such as acetylene, propyne, 1-butyne and the like; aromatic, cyclic and heterocyclic compounds such as styrene, pyrrole, pyridine, and dienes such as 1,3-butadiene, 1,3-pentadiene, 1,4-pentadiene, and the like. The preferred unsaturated monomer is ethylene. The flow rates at which the vaporous unsaturated monomer and the nitrogen gas are passed into the reaction chamber range from 1 cc STP/min to 5 cc STP/min. respectively, preferably 1–2 cc STP/min. for ethylene and 1–2 cc STP/min. for nitrogen. At lower flow rates long residence times for the gaseous materials in the reaction chamber can be achieved thus improving the chance for polymerization of the unsaturated monomer. The amount of unsaturated monomer relative to nitrogen is that amount sufficient for reaction, usually a 1:1 mole ratio. The partial pressures of the unsaturated monomer and nitrogen gas within the reaction chamber range from 0.1 to 0.4 torr and 0.1 to 0.4 torr respectively, preferably 0.2 torr for ethylene to 0.1 to 0.2 torr for nitrogen. The total gas pressure in the reaction chamber should not exceed 1 torr since a discharge abive 1 torr can not be maintained at 15 watts. Any convenient means can be employed for obtaining the mixed gases which are subjected to the RF field to form the plasma. In one embodiment unsaturated monomer gas is admitted at a predetermined flow rate into the reaction chamber and a throttling valve on the vacuum pump which evacuates the system is adjusted so the desired pressure is attained, usually 0.2 torr. Thereafter, nitrogen is admitted and controlled so that the desired total pressure is achieved, normally 0.4 torr. When the gases have equilibrated and stabilized, the plasma is then initiated. It is sometimes necessary during the deposition process to open the throttling valve slightly in order to maintain the pressure below 0.5 torr, if desired.

The unsaturated monomer and nitrogen which flow into the reaction chamber form a plasma as the gases are subjected to an electrical discharge. The electrical discharge can be applied by any convenient means. In one embodiment the plasma can be formed by subjecting the gaseous mixture of the reactants to an electrical discharge generated between the two electrodes of an RF generator. In this technique any suitable radio frequency can be used as well as any convenient electrode configuration, although a frequency of 13.56 MHz is normally used because that is the frequency designated for industrial and research use. Thus, the electrodes can be in various forms such as plates, bands, and the like positioned at appropriate places on the reaction chamber and can be formed of any satisfactory metal. In a preferred embodiment the plasma is generated between two copper disc electrodes at a frequency of 13.56 MHz, and at a power of 15 watts. In another embodiment the electrical discharge which generates the plasma can be formed by conducting microwave energy from a suitable source to the reaction chamber by a waveguide.

The deposition reaction is conducted for a length of time sufficient to achieve a membrane and this is dependent upon the power level of the generator. Normally, deposition is accomplished over a period of 400–800 secs.

Between the internally capacitively coupled electrodes within the reaction chamber and the RF generator is connected a matching network. The network maximizes the power which is supplied to the discharge. Such matching networks are conventional and any satisfactory device can be used.

The reaction chamber contains an asymmetric microporous substrate which functions as a support upon which the polymerized unsaturated monomer is deposited. The thickness of the deposited membrane is dependent upon the pore size at the substrate. Normally, the larger the pore size of the substrate, the thicker the deposited membrane. The porous substrate is supported by any convenient means within the chamber. In a preferred embodiment a grid structure supports the substrate. The substrate is normally in contact with the ground electrode, but it could be placed anywhere between the electrodes. However, because the rate of deposition of the polymeric material on the substrate and the electron density vary between the electrodes, the position of the substrate will affect the length of deposition. The position of the porous substrate relative to the flow of gases is not critical, and the surface of the substrate can be either perpendicular or parallel to the flow of gases. In a preferred embodiment, the substrate is parallel to the flow of gases but perpendicular to the plasma. Suitable materials from which the substrate is formed include homopolymers or mixed polymers of cellulose acetate, polysulfone, cellulose butyrate, cellulose nitrate, styrene, vinyl butyral and the like. Other suitable porous substrates include glass. The porosity of the substrate should be as small as possible in order to minimize the thickness of the rejecting layer. Preferably, the poresize ranges up to 200Å, but can be as high as 1000Å. A preferred embodiment of the asymmetric porous substrate is a cellulose acetate substrate having a pore size of $0.025\mu m$ (250Å) and manufactured by the ROGA Division of Universal Oil Products Cl. of San Diego, Calif. This particular material has a shiny "skin"-side and a porous dull-side and in use in the present process, the polymeric material is deposited on the shiny side of the substrate. The substrate does not have to be flat but can also be in the form of hollow fibers, tubes, an undulating surface, or the like.

When the polymeric membrane of the invention is deposited on the microporous substrate, the nitrogen gas is incorporated within the polymer usually in an amount ranging from 15–22% depending upon the deposition conditions. In other words, nitrogen does not just provide an oxygen free atmosphere within the reaction chamber, but is a reactant which is incorporated within the deposited polymeric material. This is in contrast to the processes of U.S. Pat. Nos. 3,847,652 and 3,775,308 in which the nitrogen gas is used not only to provide a protective atmosphere, but also to promote the rate of polymerization. In the polymeric membrane of the present invention, on the other hand, the nitrogen is chemically combined with the unsaturated monomer as evidenced by infrared analysis of the deposited membrane which shows nitrogen present in several oxidation states. Infrared analysis suggests the presence of amine, imine, nitrile and the like functionality in the membrane. One of the advantages of the present process is that since both the unsaturated monomer and nitrogen are gaseous materials, the amounts of each material reacted can be readily controlled to achieve the optimum conditions for the synthesis of membranes having high urea rejecting characteristics. Thus, for example, at a low partial pressure of nitrogen, i.e. about 0.05 torr, insufficient nitrogen is present to be incorporated within the polymer. It is essential that the membrane contain nitrogen if it is to be permeable to water. At high nitrogen partial pressures, i.e. about 0.3 torr, the resulting membranes obtained do not possess good urea rejecting properties.

After the polymeric film or membrane has completely formed, the deposition process can be terminated by shutting off the source of power and by allowing the reaction chamber to achieve atmospheric pressure conditions. No precautionary measures are necessary to prevent exposure of the deposited membrane to ambient atmospheric conditions.

An important feature of the present invention relates to the power which is applied by the RF generator to form the plasma. The plasma in the present process is subjected to a relatively low power compared to the wattages employed in the processes disclosed by the above-mentioned references. The maximum wattage applied to the unsaturated monomer should not be greater than fifteen watts. If the polymeric membrane is deposited at a wattage greater than the upper limit, the resulting membrane while possessing good salt rejection properties, does not possess good urea rejecting characteristics. The wattages employed in the processes of the references, on the other hand, are substantially greater than the wattages employed in the present process and are typically about 48 watts for U.S. Pat. No. 3,847,652 and 30 watts for U.S. Pat. No. 3,775,308. Another feature which distinguishes the present process from those of the prior art is the fact that the membranes of the present invention can be prepared either within the electric field of the plasma discharge or outside the electric field. Confinement of the electric field to the area between the electrodes determines whether or not the membrane is deposited within or outside the electric field. The membranes of the above patents however, are only prepared outside of the electric field.

The types of apparatus and apparatus modifications used in the process of the present invention is not critical, and those shown in U.S. Pat. No. 3,847,652 herein incorporated by reference can be satisfactorily employed. Reference is hereby made to the accompanying drawing which shows a preferred embodiment of the reaction system of the present system. The reactor is a glass cross 1 in which is positioned a pair of electrodes 3 and 5 in oppositely opposed arms of the cross. In the embodiment shown the cross is a 10 cm diameter glass cross. Electrode 3 is positive and is connected to external radio frequency generator 7 by conductor 8. Electrode 5 is positioned opposite the positive electrode and is connected to ground by conductor 9. The electrodes can be of any convenient size and in a preferred embodiment are 9 cm O.D. copper electrodes. Each of the openings on the four arms of the cross can be sealed vacuum tight by placing teflon sealing gaskets 11 between the end of each arm 13 and a metal flange 15. Access into each arm of the cross can be achieved by welding an appropriate metal rod onto the flange which is usually formed of stainless steel or aluminum. Thus, nitrogen from source 17 and unsaturated monomer from source 18 are admitted through lines 19 and 21 respectively by shut off valves 20 and controlled by mass transducers 23 and flow control valves 25. The gases are mixed prior to entry into the glass cross in line 26 attached to the metal flange.

Pressure of the gaseous materials within the reactor is controlled by the throttling valve 30 in line 31 placed between the cross and vacuum pump 33. The throttle valve can be any conventional valve suitable for such control purposes. The reactor is also provided with a line 35 through which the system can be vented and which is controlled by toggle valve 37. A cold trap can optionally be placed within line 31 before the vacuum pump. However, if a cold trap is used, the throttling valve should be placed between the glass reactor and the trap. By adjusting the throttling valve the flow rates of the gases from the reaction chamber can be adjusted thereby influencing the residence times of the gases in the plasma. Slow flow rates on the order of 1-2 cc STP/min. are maintained by the valve which results in membranes that are tighter and more highly crosslinked. These characteristics are necessary if the membrane is to possess high urea rejection properties.

The electrodes positioned within the glass cross are coupled to any convenient RF source. The electrodes are capacitively coupled to the RF source rather than inductively coupled.

The polymeric film or membrane of the present invention can be used to purify aqueous waste solutions containing not only salt but also urea. Thus, by reverse osmosis procedures, conceivably the membrane can be used for the purification of water in long term manned space missions, for the recycling of water aboard submarines or other vessels, for the purification of water for Army field hospitals and the like. The pressures employed in reverse osmosis procedures depends upon the osmotic pressure of the liquid to be purified. Thus, for instance, a pressure of 600 psi is commonly used for the treatment of brine while a pressure of 1500 psi is commonly used for treatment of sea water.

Having now generally described the invention, a further understanding can be obtained by reference to certain specific examples which are provided herein for purpose of illustration only and are not intended to be limiting unless otherwise specified.

The apparatus of FIG. 1 was used in the preparation of certain membranes from a plasma of nitrogen and ethylene. A series of membranes were deposited over a period of 600 seconds at flow rates of 1-2 cc STP min. for ethylene and nitrogen at a partial pressure of 0.2 torr for each gas and a total pressure of 0.4 torr. The rejection and water permeation characteristics of each membrane were measured and their characteristics compared as a function of the power (watts) used in the deposition of each membrane as shown in the table below.

| Power | Water Flux* | % Rejection | |
|---|---|---|---|
| (Watts) | (Gall./Ft$^2$-Day) | Urea | NaCl |
| 15 | 0.14 | 85.2 | 93.2 |
| 25 | 3.0 | 47.1 | 95.7 |
| 35 | 13.3 | 24.4 | 94.4 |
| 45 | 10.9 | 16.6 | 84.1 |
| 55 | 57.7 | 7.8 | 45.0 |

*applied press = 600 psi; feed solution = 10,000 ppm urea and 10,000 ppm NaCl

As is evident from the data in the table, the highest urea rejection was achieved at 15 watts. As the power was increased, the rejection properties of the membranes decreased. A discharge could not be maintained at less than 15 watts at a total pressure of 0.4 torr.

Having now fully described the invention, it will be apparent to one of ordinary skill in the art that many changes and modifications can be made thereto without departing from the spirit or scope of the invention as set forth herein.

What is claimed as new and intended to be secured by Letters Patent is:

1. A method for preparing polymeric membranes of high urea and salt rejection characteristics, which comprises:

generating a plasma of ethylene and nitrogen in an RF field having a power within the range of about 15 to about 35 watts;

forming a polymeric membrane by depositing a polymer of ethylene from said plasma onto a substrate, such that nitrogen from the nitrogen gas is incorporated within the polymer in a chemically combined form.

2. The method of claim 1, wherein said unsaturated hydrocarbon monomer is an alkene, an alkyne, a cyclic or heterocyclic compound.

3. The method of claim 1, wherein the flow rate of nitrogen into said plasma ranges from 1 to 2 cc (STP)/min.

4. The method of claim 1, wherein the flow rate of said unsaturated monomer into said plasma ranges from 1 to 2 cc (STP)/min.

5. The method of claim 1, wherein the power of the RF field which generates said plasma is 15 watts.

6. The method of claim 1, wherein the pressure of said unsaturated monomer ranges from 0.1 to 0.4 torr and the pressure of said nitrogen ranges from 0.1 to 0.4 torr.

7. The method of claim 1, wherein said nitrogen and unsaturated monomer are mixed prior to entry into said plasma.

8. The membrane of claim 7, wherein said polymeric material contains 15 to 22 wt % nitrogen.

9. The method of claim 1, wherein said plasma is created by an internal capacitively coupled discharge at a radio frequency of 13.56 MHz.

10. A reverse osmosis membrane containing nitrogen in chemically combined form prepared by the process of claim 1.

11. A process for purifying aqueous wastes containing salt and urea, which comprises:

subjecting said aqueous waste to reverse osmosis over a membrane prepared by the process of claim 1.

12. An apparatus for the plasma activated polymerization of unsaturated monomers in the presence of nitrogen, which comprises:

a glass cross reactor comprising four glass tubes, wherein an open end of each tube is joined to form a common center for all four tubes;

a pair of electrodes disposed within said reactor each through one of the four tubes of the reactor and sealed from the external environment of the reactor and coupled to a radio frequency source so as to generate a plasma within the reactor;

means for introducing and controlling the inflow of a gaseous mixture of an unsaturated monomer and nitrogen into the reactor through an unoccupied sealed tube of the reactor;

means for evacuating the glass cross reactor; and means for controlling the pressure of the gaseous mixture within the reactor, wherein said evacuating and controlling means are attached to said reactor through the remaining tube of the reactor.

13. The apparatus of claim 12, wherein one of said electrodes functions as a support within the reactor for collecting said polymerized material and is at ground potential.

14. The apparatus of claim 12, wherein said plasma is created by a radio frequency of 13.56 MHz.

15. The apparatus of claim 12, wherein said pressure control means is a throttling valve.

16. The apparatus of claim 12, wherein each of said electrodes is a 9 cm O.D. copper electrode.

17. The apparatus of claim 12, wherein said means for introducing and controlling a gaseous mixture into said reactor is a sequence of a shut off valve, a mass flow tranducer and flow control valve each in a line from a source of nitrogen and unsaturated monomer which lines are joined together prior to entry into said reactor to mix said nitrogen and unsaturated monomer.

* * * * *